United States Patent
Durandeau et al.

(12) 
(10) Patent No.: US 6,241,182 B1
(45) Date of Patent: Jun. 5, 2001

(54) HYBRID CONTROL SYSTEM FOR AN AIRCRAFT AERODYNAMIC SURFACE

(75) Inventors: Michel Durandeau; Etienne Foch, both of Toulouse (FR)

(73) Assignee: Aerospatiale Societe Nationale Industrielle, Paris (FR)

(*) Notice: Subject to any disclaimer, the term of this patent is extended or adjusted under 35 U.S.C. 154(b) by 0 days.

(21) Appl. No.: 09/300,915

(22) Filed: Apr. 28, 1999

(30) Foreign Application Priority Data

Apr. 29, 1998 (FR) .................................................. 98 05399

(51) Int. Cl.⁷ .................................................. B64C 13/42
(52) U.S. Cl. ........................... 244/75 R; 244/78; 244/227; 244/228
(58) Field of Search .................................... 244/75 R, 78, 244/221, 223, 225, 226, 227, 228, 76 R, 76 C; 60/403, 698

(56) References Cited

U.S. PATENT DOCUMENTS

| | | | |
|---|---|---|---|
| 3,809,191 | * | 5/1974 | Woodward . |
| 4,533,097 | * | 8/1985 | Aldrich ................................... 244/78 |
| 4,745,815 | * | 5/1988 | Klopfenstein ......................... 244/227 |
| 4,759,515 | * | 7/1988 | Carl ........................................ 244/227 |
| 4,876,906 | * | 10/1989 | Jones ...................................... 244/78 |
| 5,033,694 | * | 7/1991 | Sato ........................................ 244/78 |
| 5,082,208 | * | 1/1992 | Matich ................................... 244/78 |
| 5,104,062 | * | 4/1992 | Glaze ................................. 244/75 R |
| 6,177,743 | * | 1/2001 | Hartramph et al. .................... 60/698 |

FOREIGN PATENT DOCUMENTS 2603865   3/1988 (FR) .

OTHER PUBLICATIONS

French Search Report dated Jan. 8, 1999.
Sundberg, "Civil Air Transport: A Fresh Look At Power–By–Wire and Fly–By–Light," Proceedings of the national Aerospace and Electronics Conference (NAECON), Dayton, May 21–25, 1990, vol. 3, pp. 1365–1368, XP000314504, Institute of Electrical and Electronics Engineers.
Spitzer, "A New Direction in Energy Conversion: The All–Electric Aircraft," Proceedings of the 20$^{th}$ Intersociety Energy Conversion Engineering Conference, Aug. 1995, vol. 1, pp. 1388–1393, XP002089503.

* cited by examiner

*Primary Examiner*—Galen L. Barefoot
(74) *Attorney, Agent, or Firm*—Stevens, Davis, Miller & Mosher, LLP

(57) ABSTRACT

System for controlling an aerodynamic surface (1) (flap, aileron, control surface, etc.) of an aircraft.

According to the invention, this system comprises:
- an electric machine (8) which can operate either as a motor or as a generator, the output of which is connected mechanically to said aerodynamic surface (1); and
- a logic device (17) receiving information about the operating status of the electrical power supply (11) of the machine (8) and of the hydraulic servocontrol (2, 5) and controlling the actuation of said surface (1) either by said machine (8) or by said servocontrol (2, 5).

10 Claims, 3 Drawing Sheets

HYBRID CONTROL SYSTEM FOR AN AIRCRAFT AERODYNAMIC SURFACE

The present invention relates to a system for controlling an aerodynamic surface of an aircraft, such as a control surface, flap, aileron, etc.

It is known that, particularly on commercial airplanes, the system for controlling such an aerodynamic surface comprises, for reasons of redundancy, two hydraulic servocontrols in parallel. Thus, one of said servocontrols may be active, that is to say used for actuating said aerodynamic surface while the other is passive and used to damp the diverging vibrations which are due to the aerodynamic effects (flutter) and to which said aerodynamic surface is subjected. For this latter purpose, said servocontrols incorporate a damping system (shut-off valves, fluid reservoir, dashpot between the chambers of the servocontrols, etc.). Furthermore, when the active servocontrol breaks down, the passive servocontrol is activated to substitute for the latter one. Thus, continuity of the control of said aerodynamic surface is obtained.

However, such a known control system for aerodynamic surfaces has drawbacks, the main one of which is that the probability of the simultaneous loss of both servocontrols is of the order of $10^{-7}$/h, that is to say that such a loss is not improbable. There is therefore the need to provide, onboard the aircraft, an additional hydraulic fluid source to be used as a backup to pressurize at least one of the two servocontrols. Such an additional hydraulic fluid source therefore increases the mass and cost of said aircraft, while at the same time raising difficulties of installation and of performing functional tests onboard said aircraft.

Furthermore, the servocontrol damping systems also increase the cost and mass of these controls and require lengthy and difficult functional-test procedures.

The object of the present invention is to overcome these drawbacks.

To this end, according to the invention, the system for controlling an aerodynamic surface of an aircraft comprising a deliberate-actuation member available to a pilot and a hydraulic servocontrol controlled by said deliberate-actuation member, is noteworthy in that it additionally comprises:

an electric machine which can operate either as a motor or as a generator, the output of which is connected mechanically to said aerodynamic surface;

an electrical power supply, which can power said electric machine under the dependency of said deliberate-actuation member;

a resistive load into which said electric machine can output;

a switching device intended to electrically connect said electric machine either to said electrical power supply or to said resistive load;

a device for controlling the supply of hydraulic fluid to said servocontrol; and a logic device receiving information about the operating status of said electrical power supply and of said hydraulic servocontrol and controlling the status of said switching device and of said device for controlling the hydraulic supply.

It can be seen that, by virtue of the present invention, it is possible to dispense with one of the hydraulic servocontrols of the known system described above, and this therefore lowers the costs and mass and dispenses with the damping effectiveness tests associated with said dispensed with hydraulic servocontrol. This control is replaced by the electric actuator formed by said electric machine and the mechanical connection connecting it to said aerodynamic surface. Such a mechanical connection may comprise a screw which rotates as one with the shaft of said electric machine and is engaged in a nut that is prevented from turning.

It will be readily understood that when said electric machine is operating as a motor it can actuate said aerodynamic surface via said mechanical connection. By contrast, when said aerodynamic surface is actuated by the hydraulic servocontrol, said mechanical connection transmits the movements of said aerodynamic surface to said electric machine so that said electric machine can operate as a generator and output current into said resistive load. It therefore damps the aerodynamic vibrations of said surface.

It will be noted that when said electric machine is operating as a generator, the current it outputs into the resistive load can be measured and the measured value of said current can be associated with the rate at which the control surface is moved (on commercial aircraft, there is at least one position sensor on the aerodynamic surface), so that it is possible to check that damping is occurring and even measure its performance. Such monitoring, which is simple, may be continuous.

Thus, the electric actuator formed by said electric machine, associated with said mechanical connection, can exert either the function of controlling or the function of damping said aerodynamic surface. For the same to be true of the hydraulic servocontrol, all that is required is for the latter to comprise, in the known way, a damping system such as those described above.

According to a first embodiment of the control system according to the present invention, this control system is noteworthy in that:

in normal operation, said hydraulic servocontrol takes priority for controlling said aerodynamic surface, the aerodynamic vibrations thereof being damped by said electric machine operating as a generator outputting into said resistive load; and in back-up operation, when the hydraulic servocontrol has broken down, said electric machine operates as a motor to control said aerodynamic surface, said aerodynamic vibrations of said surface being damped by said hydraulic servocontrol.

In this case, said logic device may comprise:

a first input receiving information about the operating status of said electrical power supply;

a second input receiving information about the operating status of said hydraulic servocontrol;

a first output controlling the status of said switching device;

a second output controlling the status of said device for controlling the hydraulic supply;

a logic gate of the two-input AND type, of which one of the inputs is connected directly to said first input and the other is connected to said second input via an inverter, the output of said logic gate being connected to said first output; and a direct connection between said second input and said second output.

By contrast, in an alternative form, the control system according to the present invention is noteworthy in that:

in normal operation, said electric machine operating as a motor takes priority for controlling said aerodynamic surface, the aerodynamic vibrations thereof being damped by said hydraulic servocontrol; and in back-up operation, when said electric machine cannot operate as a motor, control of said aerodynamic surface is provided by said hydraulic servocontrol, the aerodynamic vibrations of said aerodynamic surface being damped by said electric machine operating as a generator outputting into said resistive load.

In this alternative form, the logic device may then comprise:

a first input receiving information about the operating status of said electrical power supply;

a second input receiving information about the operating status of said hydraulic servocontrol;

a first output controlling the status of said switching device;

a second output controlling the status of said device for controlling the hydraulic supply;

a logic gate of the two-input AND type, of which one of the inputs is connected directly to said second input and the other is connected to said first input via an inverter, the output of said logic gate being connected to said second output; and a direct connection between said first input and said first output.

In a third embodiment, the control system according to the present invention is noteworthy:

in that it comprises:
an additional hydraulic servocontrol controlled by said deliberate-actuation member and capable of controlling said aerodynamic surface;
an additional device for controlling the supply of hydraulic fluid to said additional hydraulic servocontrol; and in that, in normal operation, said hydraulic servocontrol and said additional hydraulic servocontrol take priority in controlling said aerodynamic surface, this surface being damped by said electric machine operating as a generator.

Said hydraulic servocontrols therefore form a system which has the structure of the known two-hydraulic-servocontrols system recalled above, to which there is added the electric actuator formed by said machine and its connection to the aerodynamic surface. However, in this case, the damping systems can be omitted from the two hydraulic servocontrols because the damping of the aerodynamic surface is achieved by said electric actuator.

The logic device in this third embodiment may comprise:
a first input receiving information about the operating status of said electrical power supply;
a second input receiving information about the operating status of said hydraulic servocontrol;
a third input receiving information about the operating status of said additional hydraulic servocontrol;
a first output controlling the status of said switching device;
a second output controlling the status of said device for controlling the hydraulic supply to said servocontrol;
a third output controlling the status of said additional device for controlling the hydraulic supply to said additional servocontrol;
a first logic gate of the three-input AND type, of which the first input is connected directly to said first input, the second is connected to said second input via a first inverter and the third is connected to said third input via a second inverter, the output of said first logic gate being connected to said first output;

a second logic gate of the two-input AND type, of which one of the inputs is connected directly to said second input and the other is connected to said third input via said second inverter, the output of said second logic gate being connected to said second output; and a direct connection between said third input and said third output.

The figures of the appended drawing will make it easy to understand how the invention may be embodied. In these figures, identical references denote similar elements.

FIG. 1 shows the block diagram of a first embodiment of the system according to the invention for controlling an aerodynamic surface of an aircraft.

FIGS. 2 and 3 diagrammatically illustrate two alternative forms of the logic device for the system of FIG. 1.

Figure 1:
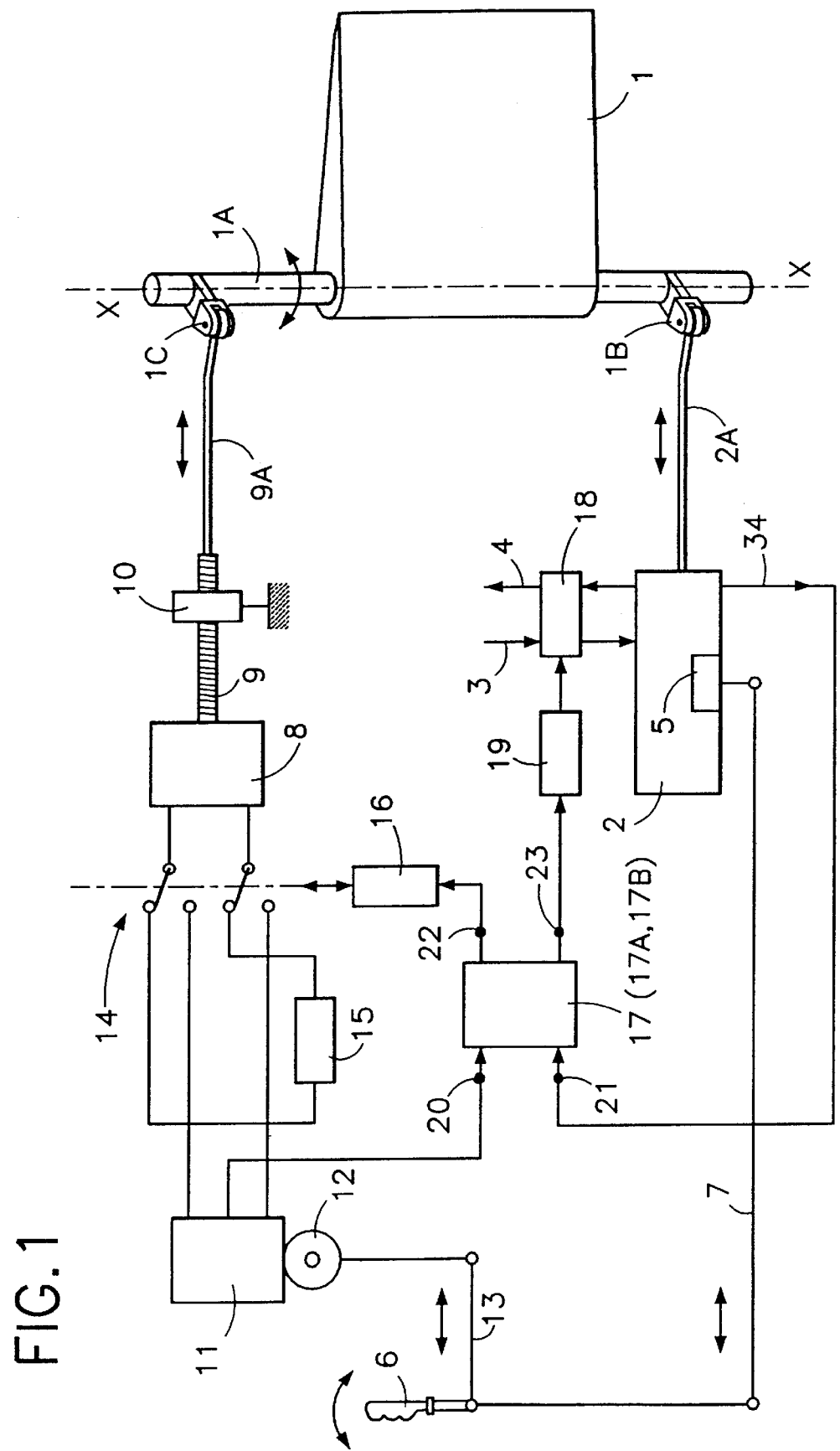

The control system according to the present invention and depicted diagrammatically in FIG. 1 is intended to control an aerodynamic surface 1 of an aircraft (not depicted), this aerodynamic surface being, for example, a flap, an aileron, an elevator or rudder of said aircraft. The aerodynamic surface 1 is able to pivot about the axis X—X of its shaft 1A under the action of a hydraulic actuator 2 supplied with hydraulic fluid via pipes 3 and 4, respectively the pressure and return pipes, and controlled by a control 5. For this purpose, the end of the rod 2A of the hydraulic actuator 2 is articulated on a yoke 1B secured to said shaft 1A.

Said control system comprises a mobile deliberate-actuation member 6, such as a pivoting stick, available to the pilot and actuating the control 5 of the actuator 2, for example via a mechanical linkage 7.

The control system of FIG. 1 additionally comprises an electric machine 8, for example with a permanent-magnet rotor capable of operating as a motor when rotated in one direction and as a generator when rotated in the opposite direction. The shaft of the machine 8 rotates as one with a screw 9, for example of the ball screw type, engaged in a nut 10 which is prevented from turning. The free end 9A of the screw 9 is articulated to another yoke 1C secured to the shaft 1A of the aerodynamic surface 1.

The electric machine 8 may be operated as a motor, that is to say supplied with electrical energy, by a power supply device 11 controlled by a position sensor 12 connected to said mobile deliberate-actuation member 6, for example via a mechanical linkage 13.

Between said machine 8 and said power supply device 11 is a double switching device 14 capable of connecting said machine 8 either to said power supply device 11 or to a resistive load 15. The switching device 14 is controlled by a relay 16 itself controlled by a logic device 17 connected to the power supply device 11, from which it receives status information.

Furthermore, between the hydraulic supply pipes 3 and 4 on the one hand, and the actuator 2 on the other hand, there is a supply control device 18 controlled by an electrically operated valve 19. This valve receives control instructions from the logic device 17, whereas information about the hydraulic pressure in the actuator 2 is supplied to said logic device 17. Thus, said logic device 17 has two inputs 20 and 21 respectively receiving information about the status of the electric power supply device 11 and about the hydraulic actuator 2, and two outputs 22 and 23 respectively controlling the relay 16 and the electrically operated valve 19.

Figure 2:
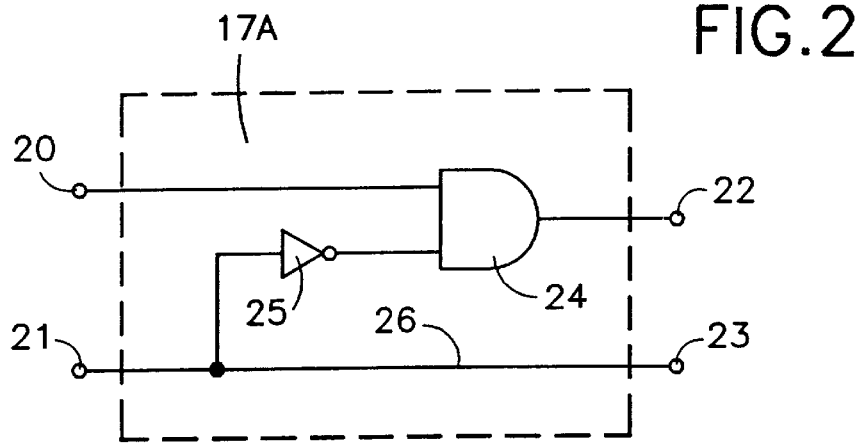

FIG. 2 depicts a first embodiment 17A for the logic device 17 of FIG. 1. The device 17A comprises a logic gate 24 of the two-input AND type. One of the inputs of said gate 24 is connected directly to the input 20, while the other input of said gate 24 is connected to the input 21 via an inverter 25. The output of the gate 24 is connected to the output 22 and a direct connection 26 connects the input 21 to the output 23.

Such a logic device 17A corresponds to the fact that the hydraulic control 2, 5 takes priority and that the electric control 8 to 12 is provided as a back-up for when the hydraulic control has broken down. The way in which the system of FIG. 1 operates is therefore as follows:

As the switch 14 connects the machine 8 to its resistive load 15 as long as the hydraulic control 2, 5 is active, the corresponding hydraulic-pressure information is applied to the input 21 of the logic device 17A and transmitted to the output 23 thereof via the link 26. In consequence, the electrically operated valve 19 controls the supply control device 18 in such a way that the hydraulic fluid is supplied to the actuator 2 which, in turn, actuates the control surface 1. Furthermore, the inverter 25 sends no signal to the AND gate 24, which means that the output 22 cannot operate the relay 16 which thus keeps the switch 14 in position (depicted in FIG. 1), for which the machine 8 is cut off from its power supply 11 and connected to the resistive load 15. The result of this is therefore that the machine 8 operates as a generator outputting to the resistive load 15. The machine 8 is therefore able to damp the vibrations (flutter) generated by the aerodynamic effects on the aerodynamic surface.

Thus, in normal operation, the aerodynamic surface 1 is actuated by the hydraulic actuator 2 and damped by the electric actuator 8, 9, 10.

If, now, the hydraulic control 2, 5 stops working, pressure information is no longer applied to the input 21, which means that the output 23 cannot operate the servocontrol 19. The hydraulic control 2, 5 is therefore shut off. However, the inverter 25 sends a signal to the AND gate 24 which, incidentally, via the input 20, receives a signal indicating that the electric power supply device 11 is in an operational state. The output 22 and relay 16 are therefore powered, which means that the switch 14 switches to its position whereby the machine 8 is powered by the device 11. The machine 8 therefore operates as a motor capable of actuating the control surface 1, under the dependency of the stick 6, the linkage 13, the position sensor 12 and the device 11. As a preference, the hydraulic control 2, 5 incorporates, in the known way, a damping system able to damp the vibrations (flutter) of the aerodynamic surface 1.

Thus, in the event of a breakdown in the hydraulic control 2, 5, the aerodynamic surface 1 is actuated by the electric actuator 8, 9, 10 and damped by this hydraulic control 2, 5.

Figure 3:
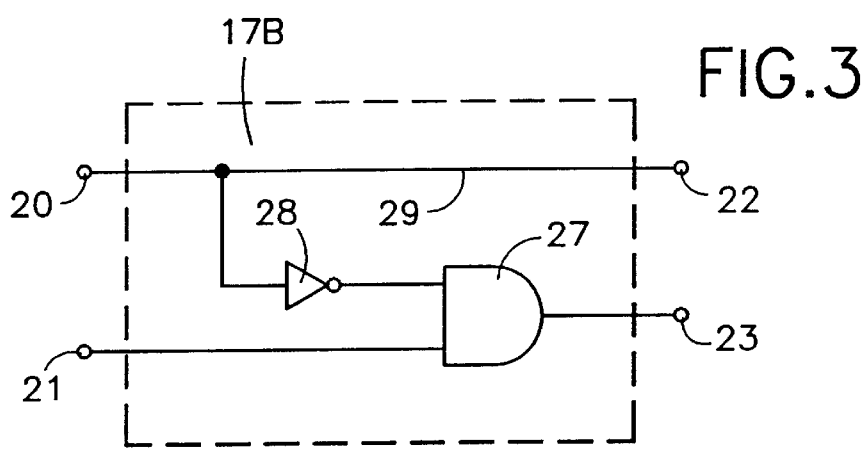

The second embodiment 17B for the logic device 17 depicted in FIG. 3 comprises a logic gate 27 of the two-input AND type. One of the inputs of said gate 27 is connected directly to the input 21, while the other input of said gate 27 is connected to the input 20 via an inverter 28. The output of the gate 27 is connected to the output 23 and a direct connection 29 connects the input 20 to the output 22.

By analogy with what was described above, it can be seen that the control system of FIG. 1, with the logic device 17B of FIG. 3, operates as follows:

in normal operation, the switch 14 connects the machine 8 to its power supply 11 and the aerodynamic surface 1 is controlled by the electric actuator 8, 9, 10 and its aerodynamic vibrations are damped by the hydraulic servocontrol 2, 5;

if the electric actuator 8, 9, 10 breaks down, the switch 14 switches into its position in which it connects the machine 8 to the resistive load 15 and the aerodynamic surface is controlled by the hydraulic servocontrol 2, 5 and its aerodynamic vibrations are damped by the electric actuator 8, 9, 10, the machine 8 of which operates as a generator outputting to the resistive load 15.

Figure 4:
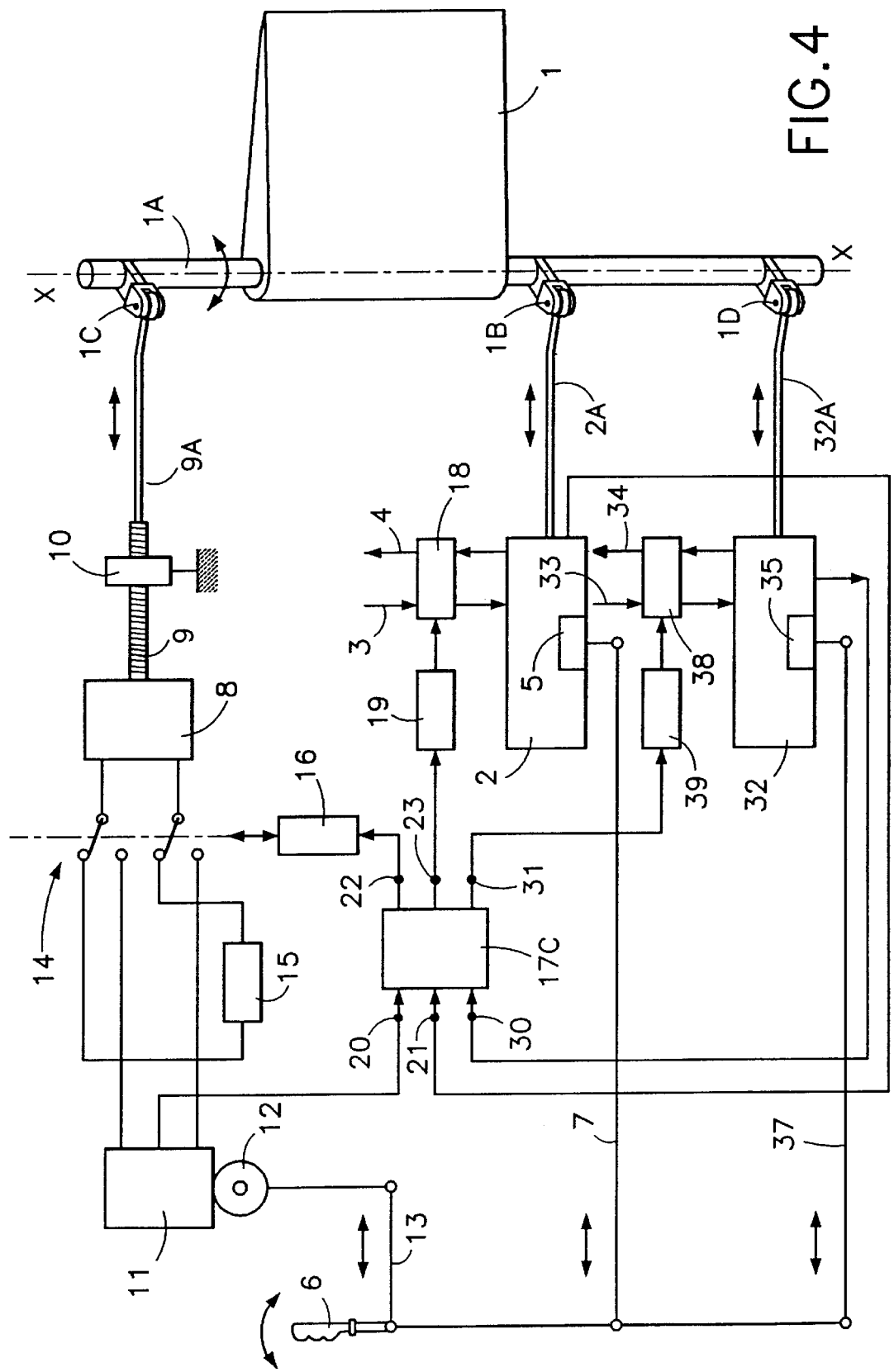
FIG. 4 is the block diagram of a second embodiment of the system according to the present invention.

In the embodiment of the system according to the present invention that is depicted in FIG. 4, the elements 1, 1A, 1B, 1C, 2, 2A, 3 to 9, 9A, 10 to 23 described with reference to FIG. 1 are encountered again, the logic device 17 being, however, replaced by a logic device 17C which, in addition to the inputs 20 and 21 and outputs 22 and 23, has an additional input 30 and an additional output 31.

The embodiment of FIG. 4 additionally comprises:

a hydraulic actuator 32 mounted in parallel with the actuator 2 and also capable of causing the aerodynamic surface 1 to pivot about its axis X—X. The actuator 32 is supplied with hydraulic fluid by pipes 33 and 34, respectively a pressure and a return pipe, and controlled by a control 35. Its actuator rod 32A is articulated to a yoke 1D secured to the shaft 1A;

a linkage 37, for example mechanical, allowing the control 35 of the actuator 32 to be actuated via the mobile deliberate-actuation member 6;

a supply control device 38 situated between the hydraulic supply pipes 33 and 34 on the one hand, and the actuator 32 on the other hand, and delivering hydraulic pressure information to the additional input 30 of the logic device 17C; and an electrically operated valve 39 controlling the supply control device 38 and receiving control instructions from the logic device 17C.

Figure 5:
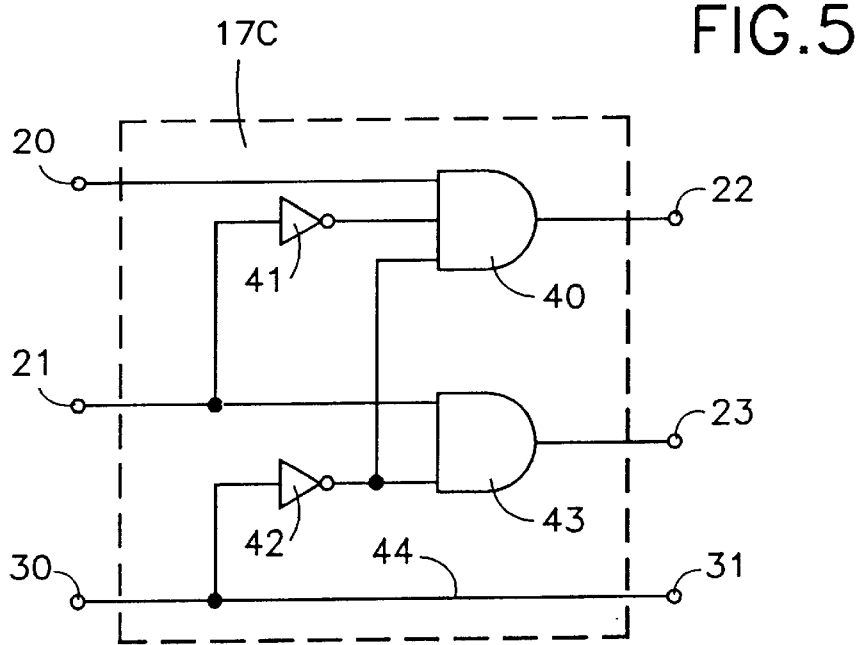
FIG. 5 is the block diagram of a logic device for the system of FIG. 4.

As can be seen from FIG. 5, the logic device 17C comprises:

a first logic gate 40 of the three-input AND type, the output of which is connected to the output 22. One of the inputs of the gate 40 is connected directly to the input 20, while the other two inputs of said gate 40 are connected respectively to the inputs 21 and 30, via inverters 41 or 42, respectively;

a second logic gate 43, of the two-input AND type, the output of which is connected to the output 23. One of the inputs of the gate 43 is connected directly to the input 21, while the other is connected to the input 30, via the inverter 42; and a direct connection 44 between the input 30 and the output 31.

It can easily be checked, by analogy with the explanations above, that the system of FIG. 4, using the device 17C of FIG. 5, operates as follows:

in normal operation, the switch 14 connects the machine 8 to the resistive load 15 and the aerodynamic surface 1 is controlled by the hydraulic servocontrol 32, 35 and its aerodynamic vibrations are damped by the electric actuator 8, 9, 10, the machine 8 of which operates as a generator;

if the hydraulic servocontrol 32, 35 breaks down, the aerodynamic surface 1 is controlled by the hydraulic servocontrol 2, 5 and its aerodynamic vibrations are still damped by the electric actuator 8, 9, 10, as above;

if both servocontrols 32, 35 and 2, 5 break down, the aerodynamic surface 1 can then be controlled by the electric actuator 8, 9, 10, the machine 8 of which then acts as a motor.

When the machine 8 is operating as a damper, measuring the current it outputs, associated with the rate of movement of the aerodynamic surface 1, allows the existence of damping and damping performance to be checked. Thus, any hidden breakdown of the damping function is eliminated, and it is no longer necessary to carry out periodic tests of this function. As a result of this it is possible, on the hydraulic controls 2, 5 and 32, 35, to dispense with the dampers that damp the vibrations of the surface 1. It will be noted that it is also possible, through this approach, to constantly check that the back-up mechanical control channel is in good working order.

Of course, although mechanical flight controls have been depicted hereinabove, it goes without saying that the flight controls could be completely or partially electrical.

What is claimed is:

1. A system for controlling an aerodynamic surface (1) of an aircraft comprising a deliberate-actuation member (6) available to a pilot and a hydraulic servocontrol (2, 5) controlled by said deliberate-actuation member (6), which additionally comprises:

an electric machine (8) which can operate either as a motor or as a generator, the output of which is connected mechanically to said aerodynamic surface (1);

an electrical power supply (11), which can power said electric machine (8) under the dependency of said deliberate-actuation member (6);

a resistive load (15) into which said electric machine (8) can output;

a switching device (14, 16) intended to electrically connect said electric machine (8) either to said electrical power supply (11) or to said resistive load (15);

a device (18, 19) for controlling the supply of hydraulic fluid to said servocontrol (2, 5); and a logic device (17, 17A, 17B, 17C) receiving information about the operating status of said electrical power supply (11) and of said hydraulic servocontrol (2, 5) and controlling the status of said switching device (14, 16) and of said device (18, 19) for controlling the hydraulic supply.

2. A system as claimed in claim 1, wherein the mechanical connection connecting said electric machine (8) to said aerodynamic surface (1) comprises a screw (9) which rotates as one with the shaft of said electric machine and is engaged in a nut (10) that is prevented from turning.

3. A system as claimed in claim 1, wherein said hydraulic servocontrol (2, 5) comprises a damping system capable of damping the vibrations of said hydraulic servocontrol when the latter is inactive.

4. A system as claimed in claim 1, wherein:

in normal operation, said hydraulic servocontrol (2, 5) takes priority for controlling said aerodynamic surface (1), the aerodynamic vibrations thereof being damped by said electric machine (8) operating as a generator outputting into said resistive load (15); and in back-up operation, when the hydraulic servocontrol (2, 5) has broken down, said electric machine (8) operates as a motor to control said aerodynamic surface (1), said aerodynamic vibrations of said surface (1) being damped by said hydraulic servocontrol (2, 5).

5. A system as claimed in claim 1, wherein:

in normal operation, said electric machine (8) operating as a motor takes priority for controlling said aerodynamic surface (1), the aerodynamic vibrations thereof being damped by said hydraulic servocontrol (2, 5); and in back-up operation, when said electric machine (8) cannot operate as a motor, control of said aerodynamic surface (1) is provided by said hydraulic servocontrol (2, 5), the aerodynamic vibrations of said aerodynamic surface (1) being damped by said electric machine (8) operating as a generator outputting into said resistive load (15).

6. A system as claimed in claim 4, wherein the logic device (17A) comprises:

a first input (20) receiving information about the operating status of said electrical power supply (11);

a second input (21) receiving information about the operating status of said hydraulic servocontrol (2, 5);

a first output (22) controlling the status of said switching device (14, 16);

a second output (23) controlling the status of said device (18, 19) for controlling the hydraulic supply;

a logic gate (24) of the two-input AND type, of which one of the inputs is connected directly to said first input (20) and the other is connected to said second input (21) via an inverter (25), the output of said logic gate (24) being connected to said first output (22); and a direct connection (26) between said second input (21) and said second output (23).

7. A system as claimed in claim 5, wherein said logic device (17B) comprises:

a first input (20) receiving information about the operating status of said electrical power supply (11);

a second input (21) receiving information about the operating status of said hydraulic servocontrol (2, 5);

a first output (22) controlling the status of said switching device (14, 16);

a second output (23) controlling the status of said device (18, 19) for controlling the hydraulic supply;

a logic gate (27) of the two-input AND type, of which one of the inputs is connected directly to said second input (21) and the other is connected to said first input (20) via an inverter (28), the output of said logic gate (27) being connected to said second output (23); and a direct connection (29) between said first input (20) and said first output (22).

8. A system as claimed in claim 1, which comprises:

an additional hydraulic servocontrol (32, 35) controlled by said deliberate-actuation member (6) and capable of controlling said aerodynamic surface (1);

an additional device (38, 39) for controlling the supply of hydraulic fluid to said additional hydraulic servocontrol (32, 35); and wherein, in normal operation, said hydraulic servocontrol (2, 5) and said additional hydraulic servocontrol (32, 35) take priority in controlling said aerodynamic surface, this surface being damped by said electric machine operating as a generator.

9. A system as claimed in claim 8, wherein neither said hydraulic servocontrol (2, 5) nor said additional hydraulic servocontrol (32, 35) are equipped with a damping system making them capable of damping the vibrations of said aerodynamic surface (1).

10. A system as claimed in claim 8, wherein said logic device (17C) comprises:

a first input (20) receiving information about the operating status of said electrical power supply (11);

a second input (21) receiving information about the operating status of said hydraulic servocontrol (2, 5);

a third input (30) receiving information about the operating status of said additional hydraulic servocontrol (32, 35);

a first output (22) controlling the status of said switching device (14, 16);

a second output (23) controlling the status of said device (18, 19) for controlling the hydraulic supply to said servocontrol (2, 5);

a third output (31) controlling the status of said additional device (38, 39) for controlling the hydraulic supply to said additional servocontrol (32, 35);

a first logic gate (40) of the three-input AND type, of which the first input is connected directly to said first input (20), the second is connected to said second input (21) via a first inverter (41) and the third is connected to said third input (30) via a second inverter (42), the output of said first logic gate (40) being connected to said first output (22);

a second logic gate (43) of the two-input AND type, of which one of the inputs is connected directly to said second input (21) and the other is connected to said third input (30) via said second inverter (42), the output of said second logic gate (43) being connected to said second output (23); and a direct connection (44) between said third input (30) and said third output (31).

\* \* \* \* \*